United States Patent
Nagasawa

(10) Patent No.: US 7,541,780 B2
(45) Date of Patent: Jun. 2, 2009

(54) CHARGE CONTROLLING CIRCUIT, CHARGE CONTROLLING METHOD, AND ELECTRONIC DEVICE PROVIDED WITH SAME CHARGE CONTROLLING CIRCUIT

(75) Inventor: Makoto Nagasawa, Tokyo (JP)

(73) Assignee: NEC Corporation, Tokyo (JP)

( * ) Notice: Subject to any disclaimer, the term of this patent is extended or adjusted under 35 U.S.C. 154(b) by 262 days.

(21) Appl. No.: 11/252,662

(22) Filed: Oct. 18, 2005

(65) Prior Publication Data
US 2006/0082346 A1   Apr. 20, 2006

(30) Foreign Application Priority Data
Oct. 18, 2004   (JP)   ............................... 2004-302763

(51) Int. Cl.
*H02J 7/00*   (2006.01)
(52) U.S. Cl. ...................................... 320/150; 320/163
(58) Field of Classification Search ................. 320/134, 320/150, 163
See application file for complete search history.

(56) References Cited

U.S. PATENT DOCUMENTS

| 5,900,717 | A | 5/1999 | Lee |
| 6,326,767 | B1 * | 12/2001 | Small et al. ................. 320/116 |
| 2004/0135552 | A1 | 7/2004 | Wolin et al. |

FOREIGN PATENT DOCUMENTS

| JP | HEI-01-107875 | 7/1989 |
| JP | HEI-6-24359 | 3/1994 |
| JP | 07-222370 | 8/1995 |
| JP | 9-19074 | 1/1997 |
| JP | 11-111350 | 4/1999 |
| JP | 2001-145274 | 5/2001 |
| JP | 2001-314045 | 11/2001 |
| JP | 2002-542748 | 12/2002 |
| JP | 2004-274871 | 9/2004 |

* cited by examiner

*Primary Examiner*—Adolf Berhane
*Assistant Examiner*—Yalkew Fantu
(74) *Attorney, Agent, or Firm*—Scully, Scott, Murphy & Presser, P.C.

(57) ABSTRACT

A charge controlling circuit is provided in which a temperature of a main body of a portable cellular phone or an ambient temperature thereof is detected by a temperature sensor and, when the temperature is higher than or equal to an lower limit in a proper temperature range required by the secondary battery and is lower than a specified reference value, a charging current having a first current value is fed to the secondary battery and, when the temperature is lower than or equal to an upper limit in a proper temperature range required by the secondary battery and is higher than or equal to the specified reference value, a charging current having a second current value being less than the first current value is fed to the secondary battery. When the temperature is a value outside of a proper temperature range required by the secondary battery, the charging to the secondary battery is stopped.

7 Claims, 8 Drawing Sheets

CHARGE CONTROLLING CIRCUIT, CHARGE CONTROLLING METHOD, AND ELECTRONIC DEVICE PROVIDED WITH SAME CHARGE CONTROLLING CIRCUIT

BACKGROUND OF THE INVENTION

1. Field of the Invention

The present invention relates to a charge controlling circuit, a charge controlling method, and an electronic device provided with the charge controlling circuit and more particularly to the charge controlling circuit being able to be suitably used in a small-sized portable electronic device such as a portable cellular phone, PDA (Personal Digital Assistant), portable music reproducing device, or a like, the charge controlling method, and the electronic device provided with the charge controlling circuit.

The present application claims priority of Japanese Patent Application No. 2004-302763 filed on Oct. 18, 2004, which is hereby incorporated by reference.

2. Description of the Related Art

A portable electronic device, such as a portable cellular phone, is so configured that specified operations are performed by using a secondary battery mounted therein as a power source and, when being powered on, a remaining capacity of the secondary battery is automatically displayed on an indicator on its displaying unit. A user, when recognizing that there is no or little remaining capacity of the secondary battery, attaches a charging device to the electronic device to charge the secondary battery.

Included among the portable electronic device of this kind is a portable cellular phone. The portable cellular phone 1, as shown in FIG. 6, is made up of an upper-side unit 10 and a lower-side unit 20 in which the upper-side unit 10 and the lower-side unit 20 are coupled to each other with a hinge portion 11 interposed between the upper-side unit 10 and the lower-side unit 20. The upper-side unit 10 has an antenna 12, a display portion 13, and a speaker 14 on its front face being put in direct contact with the lower-side unit 20 when the upper-side unit 10 folds in a manner in which the upper-side unit 10 is put in contact with the lower-side unit 20. The lower-side unit 20 has an operating section 21 made up of a plurality of buttons or a like and a microphone 22 on its front face being put in direct contact with the upper-side unit 10 when the lower-side unit 20 folds in a manner in which the lower-side unit 10 is put in contact with the upper-side unit 20. When the secondary battery (not shown) serving as a power source mounted in the portable cellular phone 1 has discharged, the secondary battery is charged again by being put on and connected to a base 30 in which a dedicated charging device is embedded. The base 30 used as the charging device supplies source voltage to be fed from an AC (Alternating Current) adapter 31 to a charging power inputting terminal (not shown) mounted in the lower-side unit 20.

FIG. 7 is a schematic block diagram showing electrical configurations of the AC adapter 31 and of main components making up the portable cellular phone 1 shown in FIG. 6. The portable cellular phone 1 shown in FIG. 7 includes a CPU (Central Processing Unit) 23, a charge controlling IC 24, a resistor 25, and a secondary battery 26. The CPU 23 controls the entire portable cellular phone 1 based on programs so that, in the example in particular, a high (hereinafter referred simply to as "H") control signal "a" is output while the secondary battery 26 is being charged. The charge controlling IC 24, when the control signal "a" fed by the CPU 23 is high, supplies a charging current set by the resistor 25 to the secondary battery 26 by using power fed from the AC adapter 31. The charging current is controlled by an emitter follower or source follower (not shown) mounted in the charge controlling IC 24. The secondary battery 26 is made up of, for example, a lithium ion battery or a like and is detachable/attachable from or to the portable cellular phone 1. Thus, the CPU 23, charge controlling IC 24, and resistor 25 make up the conventional charge controlling circuit.

The conventional charge controlling circuit is so configured that supply of a charging current is suppressed, by proper setting of a resistance value of the resistor 25, to the degree to which excessive amounts of heat are not liberated in the secondary battery 26 and in the emitter follower or source follower mounted in the charge controlling IC 24 while the secondary battery 26 is being charged. In this case, as shown in FIG. 8, when the charging is started, the secondary battery 26 is put on charge in a CC (Constant Current) charging mode, that is, at a constant current. In the charge controlling IC 24, the current value is made variable by using the external resistor 25. Thereafter, when a voltage of the secondary battery 26 exceeds about 4.1V, the charging mode is switched automatically to a CV (Constant Voltage) mode so that the secondary battery 26 is put on charge at a constant voltage. Then, the voltage of the secondary battery 26 gradually comes near to 4.2V being a fully-charged voltage. The charge controlling IC 24 outputs a voltage of 4.2V and passes a current requested by the secondary battery 26 and, therefore, the current gradually continues to decrease until the charging is completed at time "te".

Besides the conventional technology employed in the above portable cellular phone 1, another conventional technology of this kind is disclosed in Japanese Utility Model Application No. Hei 01-107875 (recited on page 1 and shown in FIG. 1). That is, in a vehicle storage battery device using the disclosed conventional technology, an overheating preventing element made of a conductive plastic which causes a rise in resistance value as, a temperature increases is inserted into a part of a charging line which feeds a charging current used to charge the storage battery at a constant voltage and is in close contact with a surface of a cell box of the storage battery. This enables suppression of a rise in a charging current occurring at time of the rise in temperature of the storage battery and also prevention of early deterioration of the storage battery.

A battery charging device as the conventional technology of this kind is also disclosed in Japanese Utility Model Application No. Hei 6-24359 (recited in Abstract and shown in FIG. 1) in which a heat sensitive element whose characteristic changes due to a rise in temperature is thermally coupled to a secondary battery and a charging current decreases or is cut off due to a rise in temperature of the secondary battery. This enables overcharge of the secondary battery to be prevented.

Moreover, a charging device as the conventional technology of the above kind is also disclosed in Japanese Patent Application Laid-open No. 2001-314045 (recited in Abstract and shown in FIG. 1) in which an environmental temperature of the charging device and a temperature of a battery are measured and, when the environmental temperature of the charging device and/or the temperature of the battery increase, by decreasing a controlling current value of the charging device and a charging voltage, prevention of overcharge of the battery is made possible.

Furthermore, another charging device having a temperature sensor as the conventional technology of the above kind is also disclosed in Japanese Patent Application Laid-open No. Hei 07-222370 (recited on Page 5 and shown in FIG. 1) in which temperatures of a transistor of a power circuit and/or a heat-liberating component such as a transformer or a like are detected by the temperature sensor so that a charging current of a secondary battery is controlled and, if an error occurs in detection of a fully-charged state, the detection of the full-charge is discontinued so that the secondary battery is charged.

However, the conventional charging circuit as described above has following problems. That is, in the electronic device operating with the secondary battery 26 being mounted such as the portable cellular phone 1, there is a tendency, in recent years, that the secondary battery 26 is so configured that its capacity is increased to satisfy extension of operating time. Therefore, in the case of use of the conventional charging current, since charging time between start of putting the secondary battery 26 on charge and completion of the charging is made longer, it is expected that the charging time is shortened by increasing the charging current. However, the charging current is controlled by an emitter follower or source follower mounted in the charge controlling IC 24 and, therefore, when the charging current is increased, generation of heat in the emitter follower or source follower increases and, as a result, an event occurs that the rise in temperature is brought up to a surface of a main body of the portable cellular phone 1.

Moreover, in the case of a comparatively large-sized electronic device such as a notebook personal computer or a like, measures to diffuse heat or to let the heat escape outside of the main body of the electronic device are taken by using a heat sink, cooling fan, or a like. However, in the case of a small-sized portable electronic device such as a PDA, portable music reproducing device, or a like as well as the above portable cellular phone 1, its cabinet is too small and it is, therefore, impossible to take such positive measures as above from the viewpoint of characteristics of a product itself. Under this circumstance, if charging currents are increased, a user of the portable device suffers a low-temperature burn (so-called cold burn) due to generation of heat in some cases. Therefore, in the case of such small-sized portable devices as above, by decreasing a charging current to the degree to which generation of heat becomes excessive, generation of heat is suppressed. As a result, a problem occurs that, due to a small amount of a charging current, full-charge cannot be achieved unless their batteries are charged for a long time.

Also, a purpose of the vehicle storage battery device disclosed in the Japanese Utility Model Application Laid-open No. Hei 01-107875 is to increase a life of the storage battery and the method is limited to a case where the storage battery is charged by constant-voltage charging. Therefore, this purpose is different from that of the present invention.

Also, a purpose of the battery charging device disclosed in the Japanese Utility Model Application Laid-open No. Hei 06-24359 is to prevent overcharge of a battery by utilizing a characteristic that, when charging of a secondary battery is completed, the secondary battery rises in temperature. Therefore, this purpose is also different from that of the present invention.

Moreover, a purpose of the charging device disclosed in the Japanese Patent Application Laid-open No. 2001-314045 is to prevent overcharge of a battery. Therefore, this purpose is different from that of the present invention.

Furthermore, a purpose of the charging device having a temperature sensor disclosed in the Japanese Patent Application Laid-open No. Hei 07-222370 is to prevent thermal-runaway of a transistor in a power circuit. Therefore, this purpose is different from that of the present invention.

SUMMARY OF THE INVENTION

In view of the above, it is an object of the present invention to provide a charge controlling circuit which is capable of charging a secondary battery in a safe manner and of suppressing extension of charging time that is caused by an increase in battery capacity.

According to a first aspect of the present invention, there is provided a charge controlling circuit employed in an electronic device to perform specified operations using a mounted secondary battery as a power source and to control a charging current to be supplied to the secondary battery, wherein a temperature of a main body of the electronic device or an ambient temperature thereof is detected and, when the temperature is higher than or equal to an lower limit in a proper temperature range required by the secondary battery and is lower than a specified reference value, a charging current having a first current value is fed to the secondary battery and, when the temperature is lower than or equal to an upper limit in the proper temperature range required by the secondary battery and is higher than or equal to the specified reference value, a charging current having a second current value being less than the first current value is fed to the secondary battery and, when the temperature is a value outside of the proper temperature range, charging of the secondary battery is stopped.

In the foregoing, a preferable mode is one that wherein includes:

a temperature detecting unit to detect a temperature of a main body of the electronic device or an ambient temperature thereof and to output a temperature detecting voltage corresponding to the detected temperature;

a level judging unit to output an active-mode judging signal when the temperature detecting voltage is a value corresponding to a temperature within the proper temperature range and a non-active mode judging signal when the temperature detecting voltage is not a value corresponding to the temperature within the proper temperature range;

a charge controlling unit to feed a charging current set by using supply power supplied from an external power source to the secondary battery when the judging signal is in an active mode and to stop supply of the charging current when the judging signal is in a non-active mode; and a charging current setting unit to set the charging current at the first current value when the temperature detecting voltage is a value corresponding to a temperature being higher than or equal to a lower limit value within the proper temperature range and being lower than the specified reference value and to set the charging current at the second current value when the temperature detecting voltage is a value corresponding to a temperature being lower than or equal to an upper limit value within the proper temperature range and being higher than or equal to the reference value.

Also, a preferable mode is one wherein the reference value is set at a value being near to an upper limit within the proper temperature range.

According to a second aspect of the present invention, there is provided a charge controlling method applied to an electronic device to perform specified operations using a mounted secondary battery as a power source and to control a charging current to be supplied to the secondary battery, wherein a temperature of a main body of the electronic device or an ambient temperature thereof is detected and, when the temperature is higher than or equal to an lower limit in a proper temperature range required by the secondary battery and is lower than a specified reference value, a charging current having a first current value is fed to the secondary battery and, when the temperature is lower than or equal to an upper limit in a proper temperature range required by the secondary battery and is higher than or equal to the specified reference value, a charging current having a second current value being less than the first current value is fed to the secondary battery and, when the temperature is a value outside of the proper temperature range, charging of the secondary battery is stopped.

According to a third aspect of the present invention, there is provided an electronic device to perform specified operations using a mounted secondary battery as a power source including:

a charge controlling circuit to detect a temperature of a main body of the electronic device or an ambient temperature thereof and to feed a charging current having a first current value to the secondary battery when the temperature is higher than or equal to a lower limit in a proper temperature range required by the secondary battery and is lower than a specified reference value and to feed a charging current having a second current value being less than the first current value to the secondary battery when the temperature is lower than or equal to an upper limit in the proper temperature range required by the secondary battery and is higher than or equal to the specified reference value, and to stop charging of the secondary battery when the temperature is a value outside of the proper temperature range.

In the foregoing, a preferable mode is one wherein the charge controlling circuit includes;

a temperature detecting unit to detect a temperature of a main body of the electronic device or an ambient temperature thereof and to output a temperature detecting voltage corresponding to the detected temperature;

a level judging unit to output an active-mode judging signal when the temperature detecting voltage is a value corresponding to a temperature within the proper temperature range and a non-active mode judging signal when the temperature detecting voltage is not a value corresponding to the temperature within the proper temperature range;

a charge controlling unit to feed a charging current set by using supply power supplied from an external power source device to the secondary battery when the judging signal is in an active mode and to stop supply of the charging current to the secondary battery when the judging signal is in a non-active mode; and a charging current setting unit to set the charging current at the first current value when the temperature detecting voltage is a value corresponding to a temperature being higher than or equal to a lower limit value within the proper temperature range and being lower than the specified reference value and to set the charging current at the second current value when the temperature detecting voltage is a value corresponding to a temperature being lower than or equal to an upper limit value within the proper temperature range and being higher than or equal to the reference value.

Furthermore, a preferable mode is one wherein the reference value is set at a value being near to an upper limit within the proper temperature range.

With the above configurations, a temperature of a main body of the portable cellular phone or an ambient temperature thereof is detected by the temperature sensor and, when the temperature is higher than or equal to an lower limit within a proper temperature range required by the secondary battery and is lower than a specified reference value, a charging current having a first current value is fed to the secondary battery and, when the temperature is lower than or equal to an upper limit in a proper temperature range required by the secondary battery and is higher than or equal to the specified reference value, a charging current having a second current value being less than the first current value is fed to the secondary battery and, when the temperature is a value outside of the proper temperature range, the charging of the secondary battery is stopped and, therefore, a risk of deterioration, expansion, occurrence of smoking, overheating, and rupture, or a like of the secondary battery can be avoided. Moreover, since the reference temperature value is set to a value being near to the upper limit within the proper temperature range, charging by using the first current value can be continued until the temperature of the main body of the electronic device or an ambient temperature thereof comes near to the upper limit within the proper temperature range, which enables speedy charging of the secondary battery. Furthermore, even if battery capacity of the secondary battery increases, it is possible to prevent charging time from becoming longer.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings. A charge controlling circuit is provided which is capable of suppressing a rise in temperature by monitoring a temperature of a main body of an electronic device operating using a secondary battery as a power source and an environmental temperature occurring while the secondary battery is being charged to stop charging at a temperature outside of a proper temperature range in order to decrease a charging current before the environmental temperature reaches an upper limit within the proper temperature range.

First Embodiment

Figure 1:
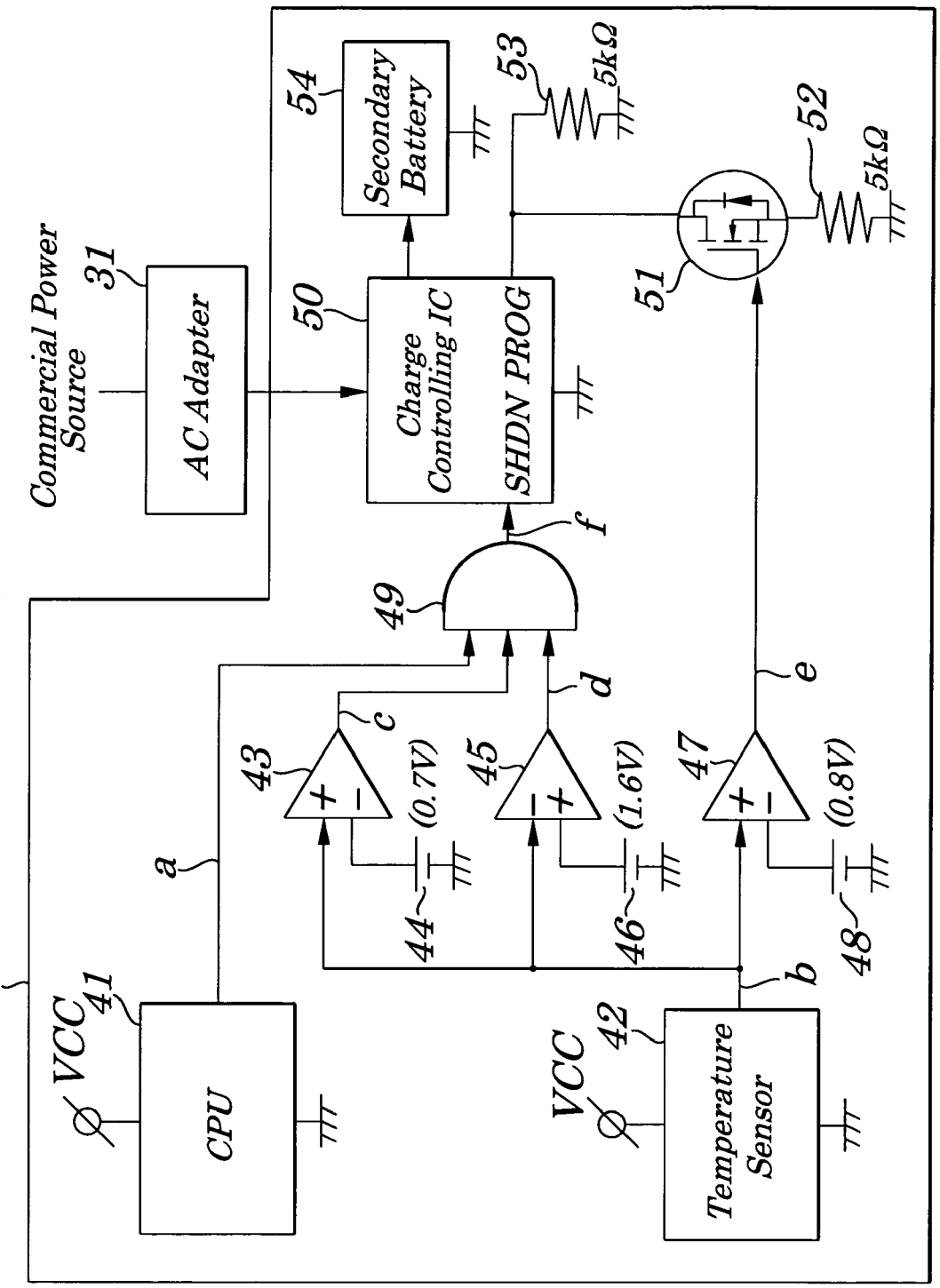
FIG. 1 is a schematic block diagram showing electrical configurations of main components making up an electronic device having a charge controlling circuit according to a first embodiment of the present invention.

FIG. 1 is a schematic block diagram showing electrical configurations of main components making up an electronic device having a charge controlling circuit of a first embodiment of the present invention.

The electronic device, as shown in FIG. 1, is a portable cellular phone 40, which includes a CPU 41, a temperature sensor 42, a comparator 43, a reference voltage source 44, an AND circuit 49, a charge controlling IC 50, a n-channel metal oxide semiconductor FET (hereinafter, referred simply to as an nMOS) 51, resistors 52 and 53, and a secondary battery 54. The CPU 41 controls the entire portable cellular phone 40 according to control programs and, in the first embodiment in particular, outputs a high (H) control signal "a" while the secondary battery 54 is being charged. The temperature sensor 42 detects a temperature of the main body of the portable cellular phone 40 or an ambient temperature thereof and outputs a temperature detecting voltage "b" corresponding to the detected temperature.

The comparator 43 compares the temperature detecting voltage "b" with a reference voltage (for example, 0.7V) fed from the reference voltage source 44 and outputs a high-level (hereinafter referred simply to as "H") output signal "c" when the temperature detecting voltage "b" is higher than or equal to 0.7V and a low-level (hereinafter referred simply to as "L") output signal "c" when the temperature detecting voltage "b" is less than 0.7V. A comparator 45 compares the temperature detecting voltage "b" with a reference voltage (for example, 1.6V) fed from a reference voltage source 46 and outputs an "H" output signal "d" when the temperature detecting voltage "b" is lower than or equal to 1.6V and an "L" output signal "d" when the temperature detecting voltage "b" is higher than 1.6V. The AND circuit 49 outputs an "H" output signal "f" when all of the control signal "a", output signal "c", and output signal "d" are high. The comparators 43 and 45 and the AND circuit 49 make up a level judging section. The level judging section outputs an active-mode judging signal (for example, "H" output signal "f") when the temperature detecting voltage "b" is a value corresponding to a temperature within a proper temperature range required by the secondary battery 54 and also outputs a non-active-mode judging signal (for example, "L" output signal "f") when the temperature detecting voltage "b" is not a value corresponding to the temperature within the proper temperature range required by the secondary battery 54.

The charge controlling IC 50 has an emitter follower or a source follower and feeds, when the output signal "f" output from the AND circuit 49 to be input to an SHDN terminal is high, by utilizing supply power from an external power device (for example, the AC adapter 31 to generate a specified direct current using a commercial power source), a charging current set by a resistor connected between a PROG terminal and ground, and stops supply of the charging current when the output signal "f" is low. The charging current decreases when a resistance value of a resistor increases and increases when the resistance value of the resistor decreases. Moreover, the charge controlling IC 50 automatically stops charging when the secondary battery 54 is fully charged. In this state, the secondary battery 54 rises in voltage as the charging progresses and the voltage reaches a peak level when the charging is completed and drops thereafter. The charge controlling IC 50 stops the charging by detection of a drop in voltage occurring after the voltage peak. This enables the charge controlling IC 50 to complete the charging without overcharging of the secondary battery 54. The secondary battery 54 is made up of, for example, a lithium ion battery or a like and is detachable/attachable from or to the portable cellular phone 40.

A comparator 47 compares the temperature detecting voltage "b" with a reference voltage (for example, 0.8V) fed from the reference voltage source 48 and outputs an "H" output signal "e" when the temperature detecting voltage "b" is higher than or equal to 0.8V and also outputs an "L" output signal "e" when the temperature detecting voltage "b" is less than 0.8V. An output signal "e" from the comparator 47 is fed to a gate electrode of the nMOS 51 and, when the output signal "e" is high, an ON state occurs between the source electrode and drain electrode and, when the output signal "e" is low, an OFF state occurs between the source electrode and drain electrode. The resistor 52 is connected between the PROC terminal of the charge controlling IC 50 and ground and is set at, for example, 5 kΩ. The resistor 53 is connected between the PROC terminal of the charge controlling IC 50 and ground with the nMOS 51 being interposed between the PROG terminal of the charge controlling IC 50 and ground and is set at, for example, 5 kΩ.

The above comparators 43, 45, and 47, reference voltage sources 44, 46, and 48, AND circuit 49, nMOS 51, and resistors 52 and 53 make up a charging current setting section. The charging current setting section, when the temperature detecting voltage "b" is a value corresponding to a temperature being higher than or equal to a lower limit within a proper temperature range required by the secondary battery 54 and being lower than a specified reference value, sets a charging current at a first current value and, when the temperature detecting voltage "b" is a value corresponding to a temperature being lower than or equal to an upper limit within the proper temperature range and being higher than or equal to the specified reference value, sets a charging current at a second current value. The above reference value, in the embodiment in particular, is set at a value near to the upper limit within the proper temperature range as a temperature corresponding to a reference temperature fed from the reference voltage source 48. The above CPU 41, temperature sensor 42, comparators 43, 45, and 47, reference voltage sources 44, 46, and 48, AND circuit 49, charge controlling IC 50, nMOS 51, resistors 52 and 53 make up a charge controlling circuit. Moreover, supply power is fed from the AC adapter 31 to any one of components making up the charge controlling circuit that requires power (for example, supply power voltage or a like for the CPU 41 and temperature sensor 42) while the secondary battery 54 is being charged.

Figure 2:
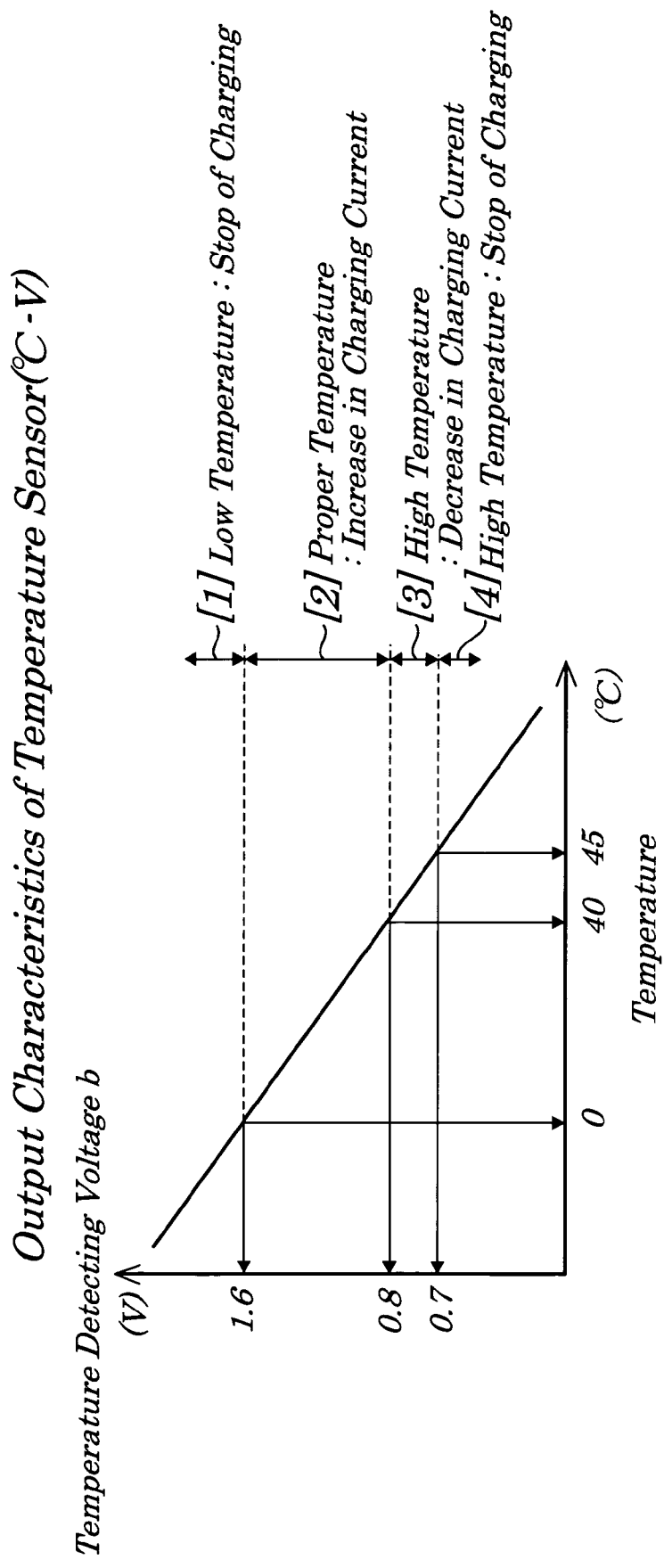
FIG. 2 is a graph showing an output characteristic of a temperature sensor of FIG. 1.

FIG. 2 is a graph showing an output characteristic of the temperature sensor 42 of FIG. 1 in which a temperature detecting voltage "b" is plotted as ordinate and a temperature as abscissa. The temperature sensor 42, as shown in FIG. 2, outputs the temperature detecting voltage "b" being inversely proportional to a temperature of the main body of the portable cellular phone 40 or an ambient temperature thereof. The temperature sensor 42 outputs, for example, the temperature detecting voltage "b" of 1.6 V when the temperature is 0° C., the temperature detecting voltage "b" of 0.8 V when the temperature is 40° C., and the temperature detecting voltage "b" of 0.7 V when the temperature is 45° C.

Figure 3:
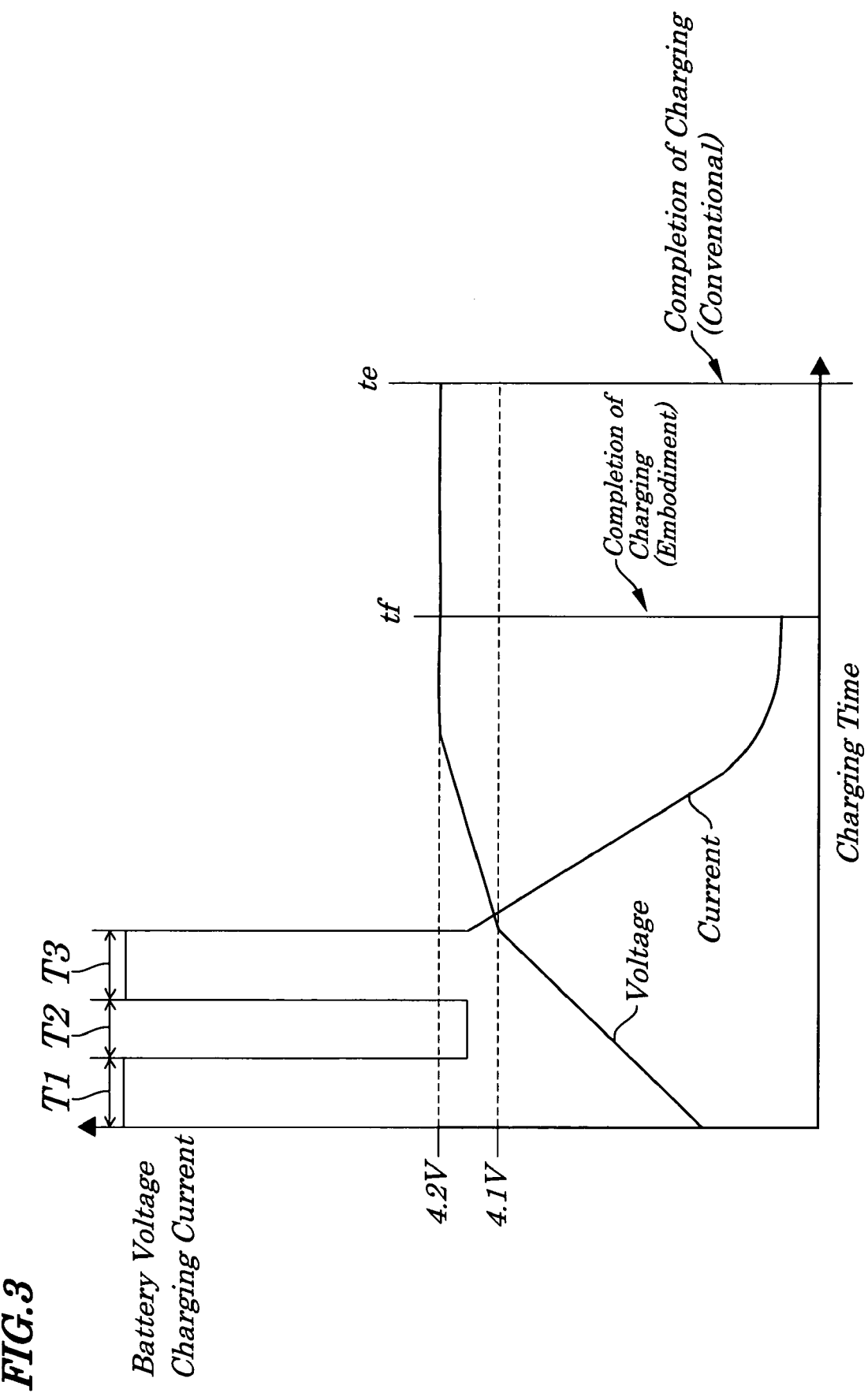
FIG. 3 is a graph showing operations of the charge controlling circuit of FIG. 1.

FIG. 3 is a diagram showing operations of the charge controlling circuit of FIG. 1 in which a charging current and a battery voltage are plotted as ordinate and charging time as abscissa. Contents of the processing in the charge controlling method employed in the embodiment are described by referring to FIGS. 2 and 3.

In the charge controlling method, a temperature of the main body of the portable cellular phone 40 or an ambient temperature thereof is detected by the temperature sensor 42 and a charging current having a first current value is supplied to the secondary battery 54 when the temperature is higher than or equal to a lower limit within a proper temperature range required by the secondary battery 54 and is lower than a specified reference value and a charging current having a second current value being less than the first current value is supplied when the temperature is lower than or equal to an upper limit within the proper temperature range required by the secondary battery and higher than or equal to the specified reference temperature value. Moreover, when the above temperature is a value outside of the proper temperature range, charging of the secondary battery 24 is stopped.

That is, it is assumed that, in order to prevent a user of the portable cellular phone 40 from suffering a low-temperature burn (so-called cold burn), the temperature of the main body of the portable cellular phone 40 or the ambient temperature is maintained at lower than or equal to 45° C. A proper temperature range required to charge the secondary battery 54 made up of the lithium ion battery is between 0° C. to about 45° C. in usual cases. Since there is a risk of occurrence of deterioration, expansion, occurrence of smoking, overheating, and rupture in the battery or a like if the secondary battery 54 is charged at a temperature outside of the proper temperature range, it is necessary that a temperature of the secondary battery 54 is kept within the proper temperature while the secondary battery 54 is being charged. Therefore, the charge controlling circuit of the portable cellular phone 40, when a temperature of the main body of the portable cellular phone 40 or an ambient temperature thereof is 0° C. or less or 45° C. or more, stops charging of the secondary battery 54.

When the temperature of the main body of the portable cellular phone 40 or an ambient temperature thereof becomes lower than 0° C., the temperature detecting voltage "b" output from the temperature sensor 42, as shown in FIG. 2, becomes 1.6 V or more. Then, the comparator 45 outputs an "L" output signal "d" and the AND circuit 49 outputs an "L" output signal "f". Therefore, the charge controlling IC 50 stops supply of a charging current to the secondary battery 54 (see State [1] in FIG. 2). Similarly, when a surface temperature of the portable cellular phone 40 exceeds 45° C., the temperature detecting voltage "b" output from the temperature sensor 42, as shown in FIG. 2, becomes lower than or equal to 0.7V. Then, the comparator 43 outputs an "L" output signal "c" and the AND circuit 49 outputs an "L" output signal "f". As a result, the charge controlling IC 50 stops supply of the charging current to the secondary battery 54 (see State [4] in FIG. 2).

The charge controlling IC 50, when a resistance of the resistor connected between the PROG terminal and ground is 5 kΩ, feeds a charging current of, for example, 300 mA to the secondary battery 54 and, when the resistance of the above resistor is 2.5 kΩ, feeds a charging current of, for example, 600 mA to the secondary battery 54. Therefore, in the State [3] in FIG. 2, of "High temperature: decrease in charging current", the charging current of 300 mA is fed to the secondary battery 54 and, in the State [2] in FIG. 2 of "Proper temperature: increase in charging current", the charging current of 600 mA is fed to the secondary battery 54. At the time of start of charging, when the temperature of the main body of the portable cellular phone 40 or an ambient temperature thereof is in the range of 0° C. to 40° C., the temperature detecting voltage "b" output from the temperature sensor 42 becomes 0.8V to 1.6V and an "H" output signal "e" is output from the comparator 47. At this time point, an ON state occurs between the source and drain of the nMOS 51 which makes a state occur in which a resistor of 2.5 kΩ obtained by connecting the resistor 52 and the resistor 53 in parallel is connected between the PROG terminal and ground of the charge controlling IC 50 and, at time T1 shown in FIG. 3, a charging current of 600 mA is fed to the secondary battery 54.

In this state, heat is liberated from the charge controlling IC 50 and the temperature of the main body of the portable cellular phone 40 or an ambient temperature thereof is apt to increase and, when the above temperature exceeds 40° C., the output signal "e" output from the comparator 47 becomes low. At this time, the nMOS 51 is turned OFF and the resistor 52 is isolated from the circuit. As a result, a state occurs in which only the resistor 53 is connected between the PROG terminal and ground of the charge controlling IC 50 and, at time T2 shown in FIG. 3, a charging current of 300 mA is fed to the secondary battery 54. Thereafter, generation of heat from the charge controlling IC 50 is suppressed and the temperature of the main body of the portable cellular phone 40 or an ambient temperature thereof decreases. Then, when the above temperature becomes lower than 40° C., an output signal "e" output from the comparator 47 becomes high, causing the nMOS 51 to be turned ON and, at time T3 shown in FIG. 3, a charging current of 600 mA is fed again to the secondary battery 54.

After that, this operation is repeated until the voltage of the secondary battery 54 reaches about 4.1 V and the charging current becomes 600 mA at a proper temperature and, when the temperature increases to exceed 40° C., the charging current becomes 300 mA and, as a result, the rise in temperature is suppressed.

Figure 8:
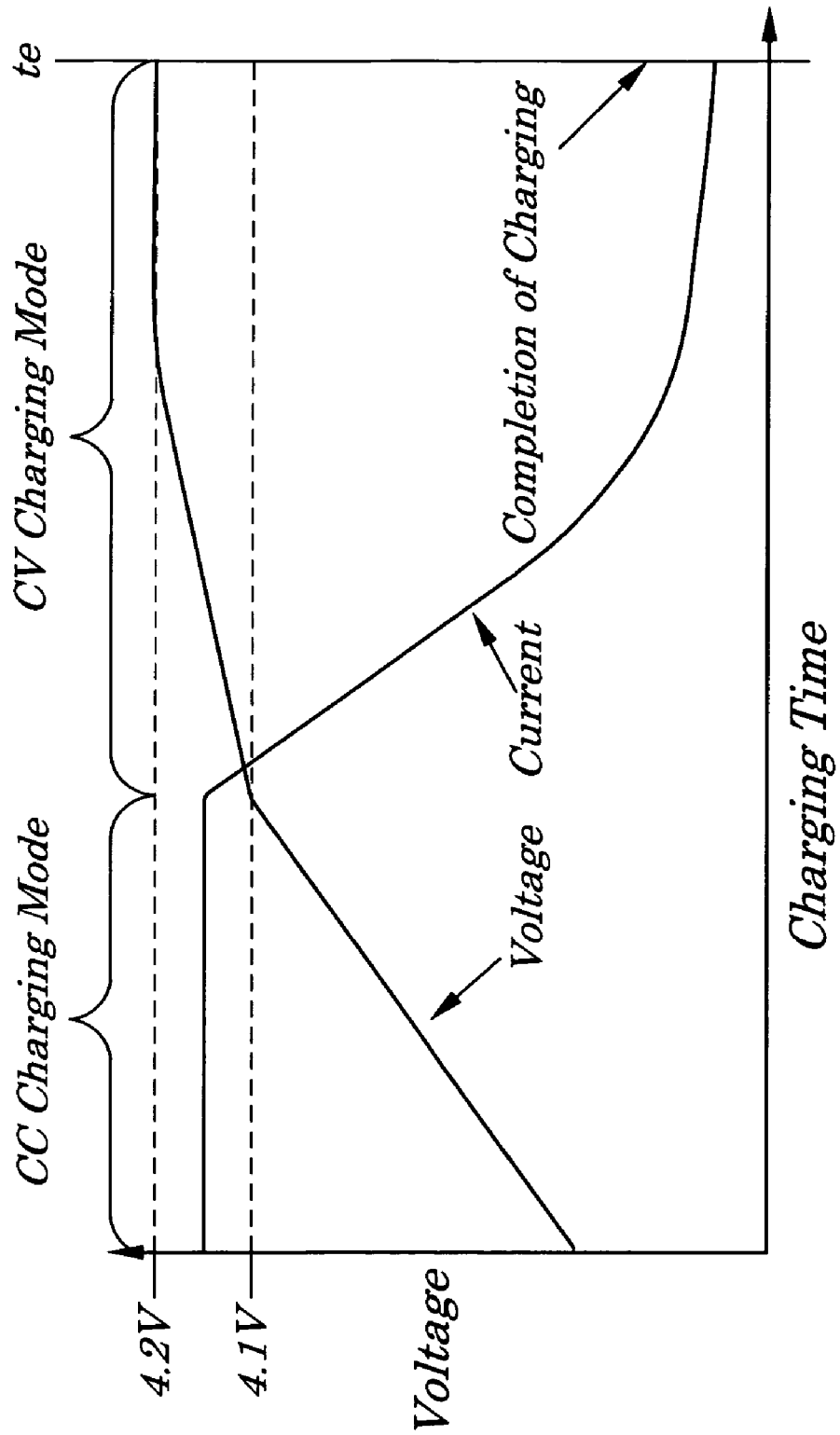
FIG. 8 is a graph explaining operations of the conventional charge controlling circuit of FIG. 7.

Then, when the voltage of the secondary battery 54 exceeds about 4.1 V, the charging mode is automatically switched to the CV charging mode so that the secondary battery 54 is put on charge at a constant voltage. The battery voltage gradually comes near to 4.2 V being a fully-charged voltage. The charge controlling IC 50 outputs a voltage of 4.2 V and passes a current required by the secondary battery 54 and, therefore, the current gradually decreases until the charging is completed at time "tf". Thus, very high-speed charging can be achieved when compared with a case where the secondary battery is charged slowly by using a charging current having been set assuming that the applied temperature is always proper and, therefore, the charging is completed at time "tf" being earlier than the time "te" when the charging is completed shown in FIG. 8, which, as a result, shortens the charging time.

As described above, according to the first embodiment, since a temperature of a main body of the portable cellular phone 40 or an ambient temperature thereof is detected and charging is stopped at a temperature outside of a proper range for charging of the secondary battery 54, the risk of occurrence of deterioration, expansion, occurrence of smoking, overheating, and rupture in the secondary battery 54 can be avoided. Moreover, by decreasing a charging current before a temperature of the main body of the portable cellular phone 40 or an ambient temperature thereof reaches a temperature outside of the proper range for charging of the secondary battery 54, with the aim of returning the temperature to a value within the proper range, charging is continued without stop of the charge. Also, since a charging current can be set without considering the rise in a temperature of the main body of the portable cellular phone 40 or in an ambient temperature thereof, high-speed charging is completed when compared with the case where the battery is charged slowly by decreasing a charging current in fear of a rise in temperature. Furthermore, even if battery capacity of the secondary battery 54 increases, it is possible to prevent charging time from becoming longer, thus saving the user time and reducing wasteful commercial power.

Second Embodiment

Figure 4:
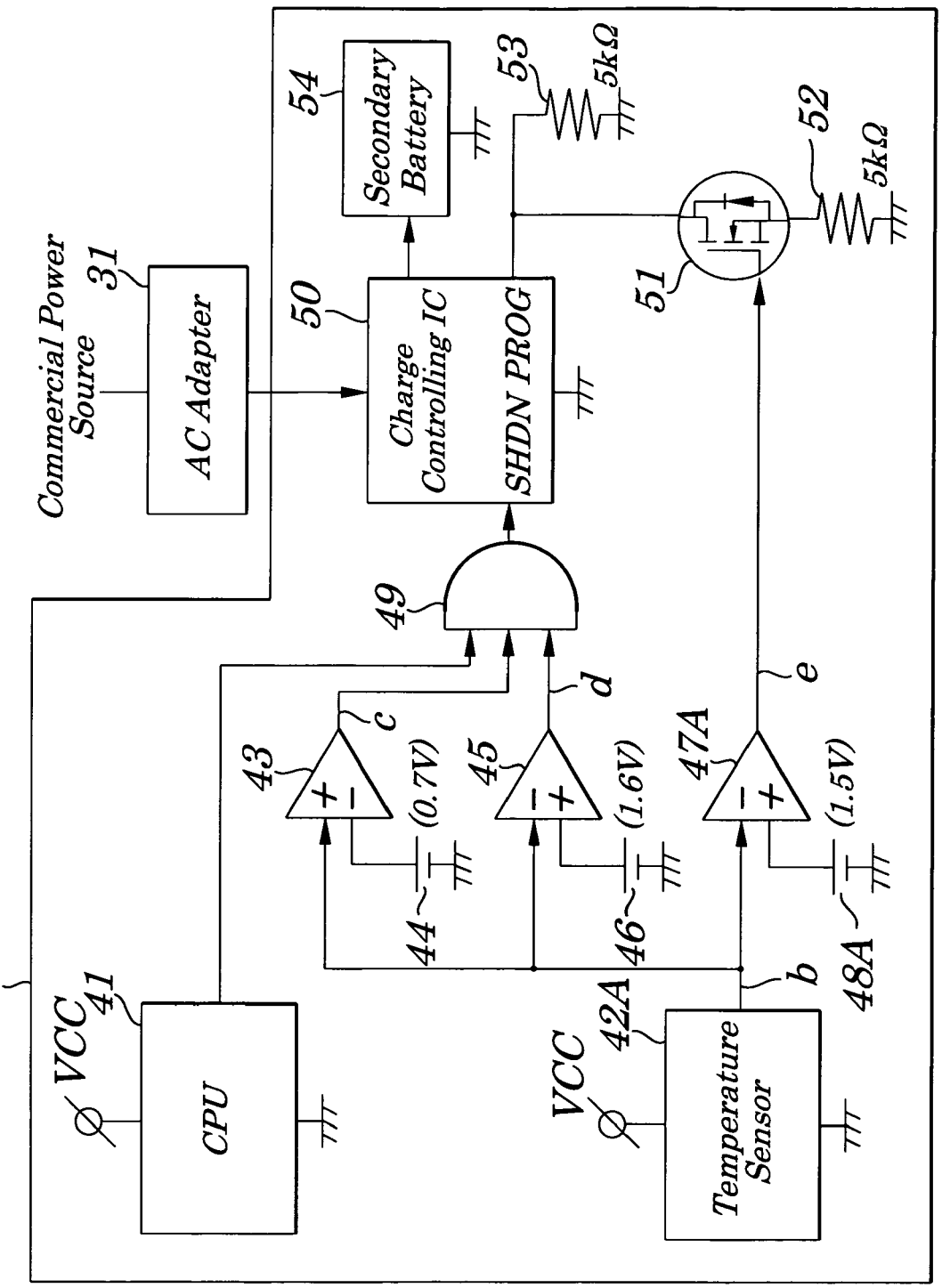
FIG. 4 is a schematic block diagram showing electrical configurations of an electronic device having a charge controlling circuit of a second embodiment of the present invention.

FIG. 4 is a schematic block diagram showing electrical configurations of an electronic device having a charge controlling circuit of a second embodiment of the present invention. In FIG. 4, same reference numbers are assigned to components having the same functions as those shown in FIG. 1 of the first embodiment.

A portable cellular phone 40A of the second embodiment, as shown in FIG. 4, includes, instead of a temperature sensor 42, comparator 47, and reference voltage source 48 as shown in FIG. 1, a temperature sensor 42A, a comparator 47A, and a reference voltage source 48A, each having configurations different from those in FIG. 1. The temperature sensor 42A, as shown in a graph of FIG. 5, outputs a temperature detecting voltage "b" being proportional to a temperature of a main body of the portable cellular phone 40A or an ambient temperature thereof. For example, the temperature sensor 42A outputs, when the temperature is 0° C., a temperature detecting voltage "b" of 0.7V and, when the temperature is 40° C., a temperature detecting voltage "b" of 1.5V and, when the temperature is 45° C., a temperature detecting voltage "b" of 1.6V. The comparator 47A compares a temperature detecting voltage "b" with a reference voltage (for example, 1.5V) fed from the reference voltage source 48A and outputs an "H" output signal "e" when the temperature detecting voltage "b" is lower than or equal to 1.5V and an "L" output signal "e" when the temperature detecting voltage "b" is higher than 1.5 V. Configurations other than described above are the same as shown in FIG. 1.

Figure 5:
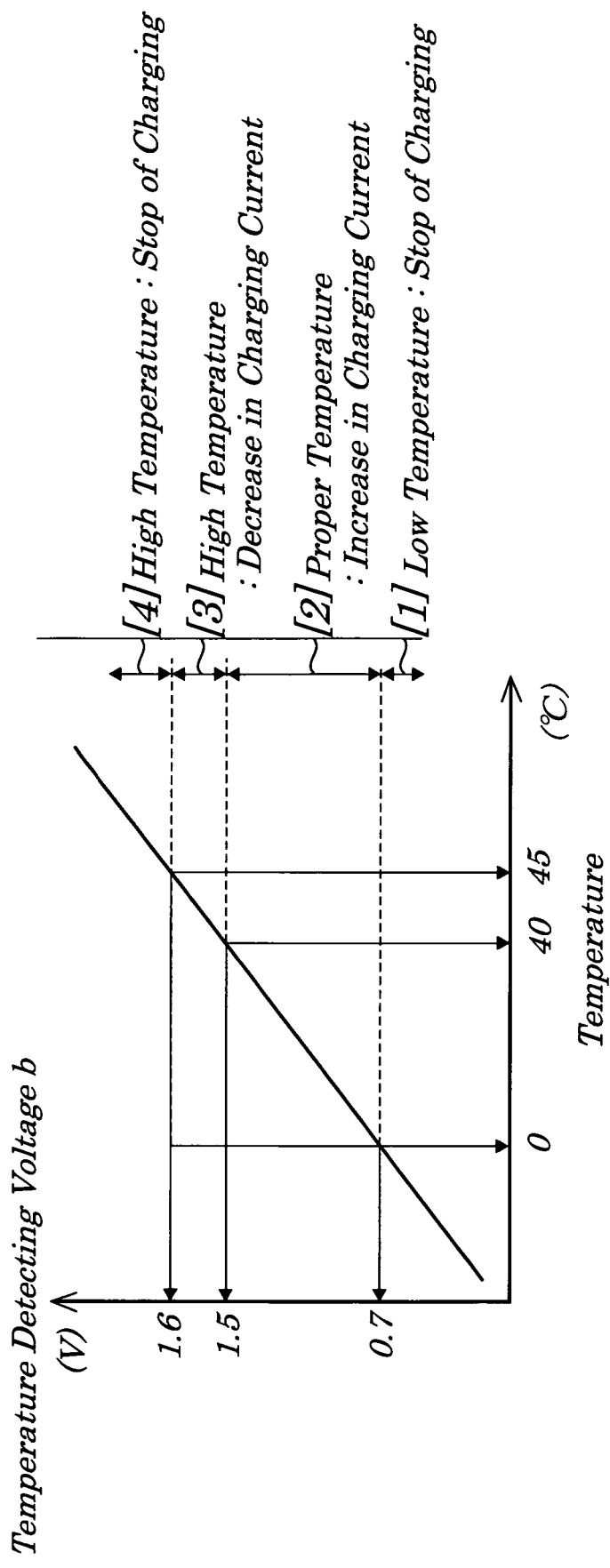
FIG. 5 is a graph showing an output characteristic of a temperature sensor of FIG. 4.
Figure 6:
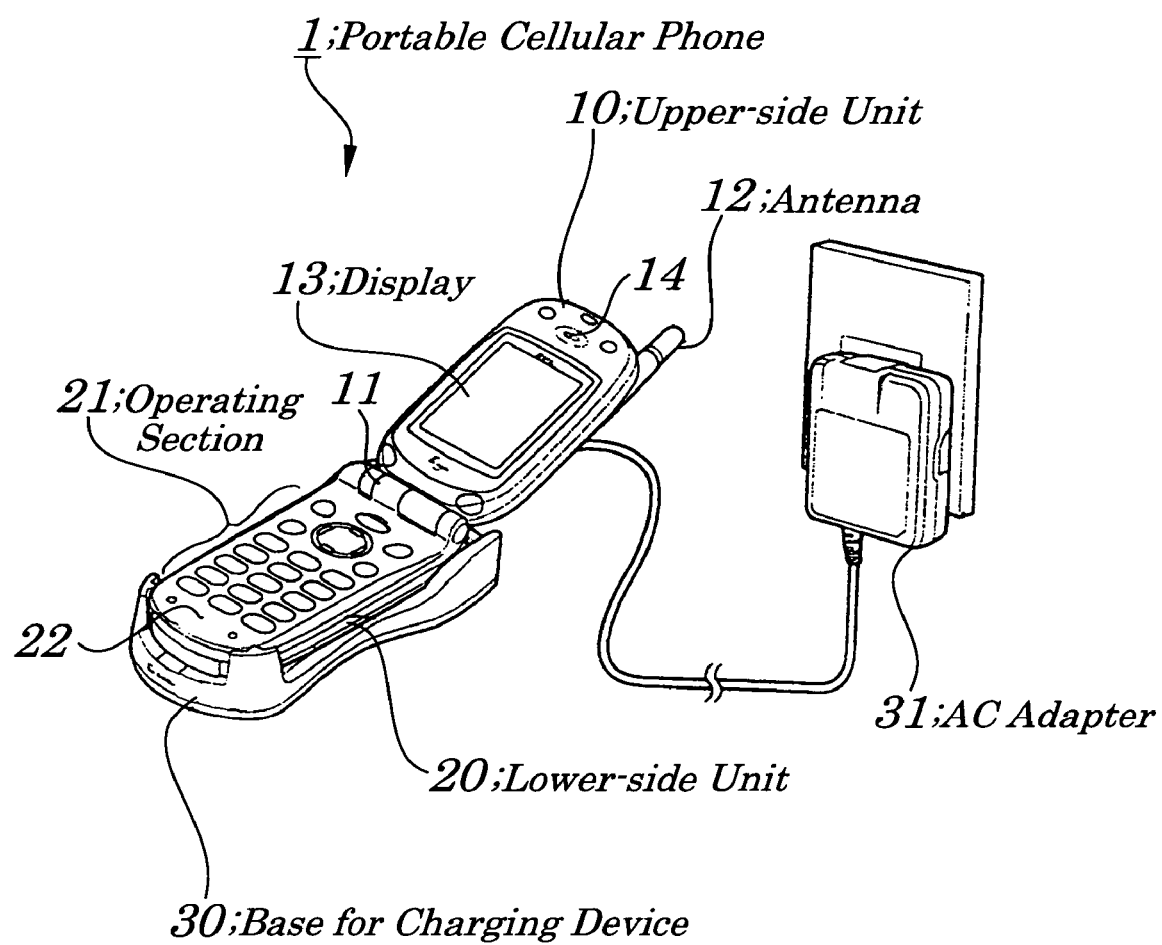
FIG. 6 is a diagram showing a portable cellular phone in a state in which a secondary battery having a conventional charge controlling circuit is charged.
Figure 7:
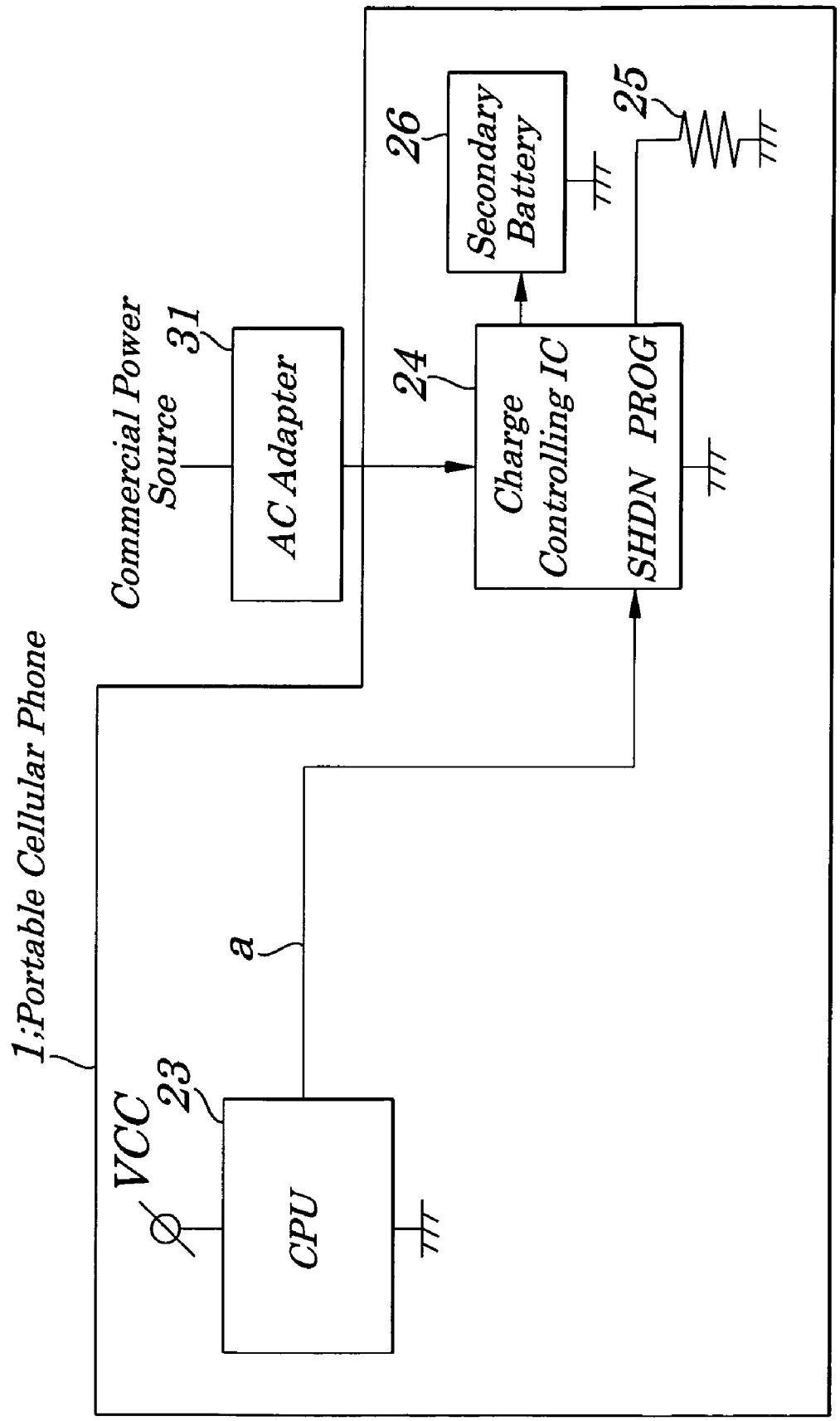
FIG. 7 is a schematic block diagram showing electrical configurations of an AC adapter and of main components making up the portable cellular phone in FIG. 6.

In the above portable cellular phone 40A, when a temperature of the main body of the portable cellular phone 40A or an ambient temperature thereof is lower than 0° C., the temperature detecting voltage "b" of the temperature sensor 42A becomes lower than or equal to 0.7V, as shown in FIG. 5. Then, a comparator 43 outputs an "L" output signal "c" and an AND circuit 49 outputs an "L" output signal "f". Therefore, a charge controlling IC 50 stops supply of a charging current to a secondary battery 54 (see State [1] in FIG. 5). Similarly, when a surface temperature of the portable cellular phone 40A exceeds 45° C., the temperature detecting voltage "b" output from the temperature sensor 42A, as shown in FIG. 5, becomes higher than or equal to 1.6V. Then, a comparator 45 outputs an "L" output signal "d" and the AND circuit 49 outputs an "L" output signal "f". Therefore, the charge controlling IC 50 stops supply of a charging current to the secondary battery 54 (see State [4] in FIG. 5).

Moreover, in the State [3] in FIG. 5 of "High temperature: decrease in charging current", a charging current of 300 mA is fed to the secondary battery 54. In the State [2] in FIG. 5 of "Proper temperature: increase in charging current", a charging current of 600 mA is fed to the secondary battery 54. Moreover, at time of the start of charging, if the temperature of the main body of the portable cellular phone 40A or an ambient temperature thereof is within a temperature range of 0° C. to 40° C., the temperature detecting voltage "b" output from the temperature sensor 42A becomes 0.7V to 1.5V and an "H" output signal "e" is output from the comparator 47A. Thereafter, the same processing as in the first embodiment is performed and the same advantages as in the first embodiment can be obtained.

It is apparent that the present invention is not limited to the above embodiments but may be changed and modified without departing from the scope and spirit of the invention. For example, an AC adapter 31 that can be connected to the commercial power source may be a battery having large capacity that outputs the same voltage as the AC adapter 31 or a cigarette lighter. Also, each of the reference voltages fed from reference voltage sources 44, 46, or 48 may be a value corresponding to a value within the proper temperature range required by a secondary battery 54 and is not limited to the values provided by the above embodiments. Also, a pMOS (p-channel MOSFET) instead of an nMOS 51 may be applied by reversing a logical level of the output signal "e" output from the comparators 47 and 47A. Moreover, the nMOS may be configured by using a bipolar transistor, which can also provide the same actions and effects as achieved in the above embodiments.

Furthermore, the present invention may be applied to general small-sized portable electronic devices such as a portable cellular phone, PDA, portable music reproducing device (MD player, hard disk player, or a like) that are capable of recharging of their secondary batteries.

What is claimed is:

1. A charge controlling circuit employed in an electronic device to perform specified operations using a mounted secondary battery as a power source and to control a charging current to be supplied to said secondary battery, wherein a temperature of a main body of said electronic device or an ambient temperature thereof is detected and, when said temperature is higher than or equal to a lower limit in a proper temperature range required by said secondary battery and is lower than a specified reference value, a charging current having a first current value is fed to said secondary battery and, when said temperature is lower than or equal to an upper limit in said proper temperature range required by said secondary battery and is higher than or equal to said specified reference value, a charging current having a second current value being less than said first current value is found to said secondary battery and, when said temperature is a value outside of said proper temperature range, charging of said secondary battery is stopped; and a temperature detecting unit to detect a temperature of a main body of said electronic device or an ambient temperature thereof and to output a temperature detecting voltage corresponding to the detected temperature; a level judging unit to output an active-mode judging signal when said temperature detecting voltage is a value corresponding to a temperature within said proper temperature rang and a non-active mode judging signal when said temperature detecting voltage is not a value corresponding to said temperature within said proper temperature range; a charge controlling unit to feed a charging current set by using supply power supplied from an external power source to said secondary battery when said judging signal is in an active mode and to stop supply of said charging current when said judging signal is in a non-active mode; and a charging current setting unit to set said charging current at said first current value when said temperature detecting voltage is a value corresponding to a temperature being higher than or equal to a lower limit value within said proper temperature range and bring lower than said specified reference value and to set said charging current at said second current value when said temperature detecting voltage is a value corresponding to a temperature being lower than or equal to an upper limit value within said proper temperature range and being higher than or equal to said reference value.

2. The charge controlling circuit according to claim 1, wherein said reference value is set at a value being near to an upper limit within said proper temperature range.

3. A charge controlling method applied to an electronic device to perform specified operations using a mounted secondary battery as a power source and to control a charging current to be supplied to said secondary battery, wherein a temperature of a main body of said electronic device or an ambient temperature thereof is detected and, when said temperature is higher than or equal to an lower limit in a proper temperature range required by said secondary battery and is lower than a specified reference value, a charging current having a first current value is fed to said secondary battery end, when said temperature is lower than or equal to an upper limit in a proper temperature range required by the secondary battery and is higher than or equal to said specified reference value, a charging current having a second current value being less than said first current value is fed to said secondary battery and, when said temperature is a value outside of said proper temperature range, charging of said secondary battery is stopped.

4. An electronic device to perform specified operations using a mounted secondary battery as a power source comprising:
a charge controlling circuit to detect a temperature of a main body of said electronic device or an ambient temperature thereof and to feed a charging current having a first current value to said secondary battery when said temperature is higher than or equal to a lower limit in a proper temperature range required by said secondary battery and is lower than a specified reference value and to feed a charging current having a second current value being less than said first current value to said secondary battery when said temperature is lower than or equal to an upper limit in said proper temperature range required by said secondary battery and is higher than or equal to said specified reference value, and to stop charging of said secondary battery when said temperature is a value outside of said proper temperature range; a temperature detecting unit to detect a temperature of a main body of said electronic device or an ambient temperature thereof and to output a temperature detecting voltage corresponding to the detected temperature a level judging unit to output an active-mode judging signal when said temperature detecting voltage is a value corresponding to a temperature within said proper temperature range and a non-active mode judging signal when said temperature detecting voltage is not a value corresponding to said temperature within said proper temperature range;
a charge controlling unit to feed a charging current set by using supply power supplied from an external power source device to said secondary battery when said judging signal is in an active mode and to stop supply of said charging current to said secondary battery when said judging signal is in a non-active mode; and
a charging current setting unit to set said charging current at said first current value when said temperature detecting voltage is a value corresponding to a temperature being higher than or equal to a lower limit value within said proper temperature range and being lower than said specified reference value and to set said charging current at said second current value when said temperature detecting voltage is a value corresponding to a temperature being lower than or equal to an upper limit value within said proper temperature range and being higher than or equal to said reference value.

5. The charge controlling circuit according to claim 4, wherein said reference value is set at a value being near to an upper limit within said proper temperature range.

6. A charge controlling circuit employed in an electronic device to perform specified operations using a mounted secondary battery as a power source and to control a charging current to be supplied to said secondary battery, wherein a temperature of a main body of said electronic device or an ambient temperature thereof is detected and, when said temperature is higher than or equal to ~lower limit in a proper temperature range required by said secondary battery and is lower than a specified reference value, a charging current having a first current value is fed to said secondary battery and, when said temperature is lower than or equal to an upper limit in said proper temperature range required by said secondary battery and is higher than or equal to said specified reference value, a charging current having a second current value being less than said first current value is found to said secondary battery and, when said temperature is a value outside of said proper temperature range, charging of said secondary battery is stopped; and
a temperature detecting means to detect a temperature of a main body of said electronic device or an ambient temperature thereof and to output a temperature detecting voltage corresponding to the detected temperature a level judging means to output an active-mode judging signal when said temperature detecting voltage is a value corresponding to a temperature within said proper temperature range and a non-active mode judging signal when said temperature d~voltage is not a value corresponding to said temperature within said proper temperature range;
a charge controlling means to feed a charging current set by using supply power supplied from an external power source to said secondary battery when said judging signal is in an active mode and to stop supply of said charging current when said judging signal is in a non-active mode; and
a charging current setting moans to set said charging current at said first current value when said temperature detecting voltage is a value corresponding to a temperature being higher than or equal to a lower limit value within said proper temperature range and being lower than said specified reference value and to set said charging current at said second current value when said temperature detecting voltage is a value corresponding to a temperature being lower than or equal to an upper limit value within said proper temperature range and being higher than or equal to said reference value.

7. An electronic device to perform specified operations using a mounted secondary battery as a power source comprising:
a charge controlling circuit to detect a temperature of a main body of said electronic device or an ambient temperature thereof and to feed a charging current having a first current value to said secondary battery when said temperature is higher than or equal to a lower limit in a proper temperature range required by said secondary battery and is lower than a specified reference value and to feed a charging current having a second current value being less than said first current value to said secondary battery when said temperature is lower than or equal to an upper limit in said proper temperature range required by said secondary battery and is higher than or equal to said specified reference value, and to stop charging of said secondary battery when said temperature is a value outside of said proper temperature range; a temperature detecting unit to detect a temperature of a main body of said electronic device or an ambient temperature thereof and to output a temperature detecting voltage corresponding to the detected temperature a level judging unit to output an active-mode judging signal when said temperature detecting voltage is a value corresponding to a temperature within said proper temperature range and a non-active mode judging signal when said temperature detecting voltage is not a value corresponding to said temperature within said proper temperature range;

a temperature detecting means to detect a temperature of a main body of said electronic device or an ambient temperature thereof and to output a temperature detecting voltage corresponding to the detected temperature;

a level judging means to output an active-mode judging signal when said temperature detecting voltage is a value corresponding to a temperature within said proper temperature rang and a non-active mode judging signal when said temperature detecting voltage is not a value corresponding to said temperature within said proper temperature range;

a charge controlling means to feed a charging current set by using supply power supplied from an external power source device to said secondary battery when said judging signal is in an active mode and to stop supply of said charging current to said secondary battery when said judging signal is in a non-active mode; and a charging current setting means to set said charging current at said fast current value whoa said temperature detecting voltage is a value corresponding to a temperature being higher than or equal to a lower limit value within said proper temperature range and being lower than said specified reference value and to set said charging current at said second current value when said temperature detecting voltage is a value corresponding to a temperature being lower than or equal to an upper limit value within said proper temperature range and being higher than or equal to said reference value.

\* \* \* \* \*